(12) United States Patent
Harris et al.

(10) Patent No.: US 8,473,841 B2
(45) Date of Patent: Jun. 25, 2013

(54) INDEPENDENT VISUAL ELEMENT CONFIGURATION

(75) Inventors: Tristan Arguello Harris, San Francisco, CA (US); Ömer Faruk Nafiz Ateş, Zoeterwoude (NL)

(73) Assignee: Google Inc., Mountain View, CA (US)

( * ) Notice: Subject to any disclaimer, the term of this patent is extended or adjusted under 35 U.S.C. 154(b) by 96 days.

(21) Appl. No.: 13/045,402

(22) Filed: Mar. 10, 2011

(65) Prior Publication Data

US 2011/0225487 A1    Sep. 15, 2011

Related U.S. Application Data

(60) Provisional application No. 61/312,436, filed on Mar. 10, 2010.

(51) Int. Cl.
    *G06F 17/00*      (2006.01)
    *G06F 9/44*      (2006.01)

(52) U.S. Cl.
USPC ........... 715/235; 715/234; 715/760; 715/786; 715/791; 717/115

(58) Field of Classification Search
USPC ................ 715/200, 201, 203, 204, 205, 206, 715/207, 208, 210, 226, 240, 243, 244, 254, 715/255, 256, 784, 785, 786, 787, 202, 209, 715/234, 235, 236, 273, 700, 749, 760, 715/762, 790, 791, 796, 856; 717/105, 106, 717/108, 109, 111, 113, 114, 115
See application file for complete search history.

(56) References Cited

U.S. PATENT DOCUMENTS

| | | | | |
|---|---|---|---|---|
| 7,380,216 B2 * | 5/2008 | Feig et al. | ..................... | 715/786 |
| 7,730,082 B2 * | 6/2010 | Sah et al. | ..................... | 707/770 |
| 7,730,109 B2 * | 6/2010 | Rohrs et al. | ................... | 707/803 |
| 2002/0063737 A1 * | 5/2002 | Feig et al. | ..................... | 345/786 |
| 2004/0119753 A1 * | 6/2004 | Zencke | ........................ | 345/786 |
| 2004/0216056 A1 * | 10/2004 | Tootill | ........................ | 715/786 |
| 2006/0190441 A1 * | 8/2006 | Gross et al. | ....................... | 707/3 |
| 2006/0224973 A1 * | 10/2006 | Albrecht et al. | .............. | 715/760 |
| 2007/0136201 A1 * | 6/2007 | Sah et al. | ........................ | 705/51 |
| 2007/0300166 A1 * | 12/2007 | Ehret et al. | ..................... | 715/760 |
| 2010/0005169 A1 * | 1/2010 | Von Hilgers | .................. | 709/224 |
| 2010/0037177 A1 * | 2/2010 | Golsorkhi | ..................... | 715/818 |
| 2010/0161586 A1 * | 6/2010 | Safar | ............................ | 707/707 |
| 2010/0179949 A1 * | 7/2010 | Safar | ............................ | 707/707 |
| 2010/0325529 A1 * | 12/2010 | Sun | ............................ | 715/800 |
| 2011/0283227 A1 * | 11/2011 | Moore et al. | .................. | 715/800 |

* cited by examiner

*Primary Examiner* — Maikhanh Nguyen
(74) *Attorney, Agent, or Firm* — Sterne, Kessler, Goldstein & Fox P.L.L.C.

(57) ABSTRACT

A system and a method are disclosed for a configuration in which any user interface feature that would otherwise have been hidden while the user is interacting with the rest of the web page are made available at the top of the web page. If the user scrolls up to the top of the page the bar will disappear again to make the entire browser window available for page content and not conflict with the top user interface elements.

12 Claims, 6 Drawing Sheets

INDEPENDENT VISUAL ELEMENT CONFIGURATION

CROSS REFERENCE TO RELATED APPLICATIONS

This application claims the benefit of U.S. Provisional Application No. 61/312,436, filed Mar. 10, 2010, which is incorporated by reference in its entirety.

BACKGROUND

1. Field of Art

The disclosure generally relates to the field of user interface elements displayed on a screen.

2. Description of the Related Art

A problem of placing functionality and/or user interface elements on a website is that they are often fixed and not easily discoverable and accessible by the user without being obtrusive or unnecessarily using up space. Some attempted solutions make it difficult to find the desired element in user interface. In addition, configuring more readily available elements for a user interface may require a substantial region of an existing website.

One attempted solution is to have prominent in page control elements. Many websites place navigational controls including search boxes at the top of the page, often grouped into a series of bars or boxes. This provides an obvious visual connection when the user first visits a website. However, a downside of taking up valuable screen estate when the user first visits a page and forcing the user to scroll to get to this content and then completely disappearing once the user scrolls down to read the rest of the page. The longer a web page the more likely it is that the top part of the page will be out of view for much of the time and the less effective the top navigational elements become. Furthermore, each website separately designs this feature and it typically is unavailable and unacceptable for a third party.

Another approach to this problem is the use of a persistent bar. Some websites use a persistent bar at the top or bottom of the page that stays in the same position as the user scrolls, thereby always remaining visible and accessible. A problem with this approach is that the bar now always takes up space which is disliked by many users. This fact has led to most such bars having a close or minimize button to allow users to hide or at least minimize the bar thereby removing much of the benefit of having it in the first place. This is an even bigger issue for third party services wanting to offer this functionality because they have to convince a website owner to give them control of such a persistent user interface element. Furthermore, having the bar always appear means that the underlying website will often have to be modified to avoid confusion due to functionality appearing in both the bar at the top of the page and being visible at the same time.

Another attempted approach to the scrolling problem is to place functionality in a box that lives somewhere on the page but moves with the web page as the user scrolls. In this configuration the box stays in the same relative position inside the browser viewing area. Examples of this include GEOCITIES scrolling branding (a transparent GEOCITIES logo positioned close to the right bottom corner of the browser window) and a YELP scrollable map which scrolled with the user as they moved down the page. The problem with this approach is that it is often considered distracting and unprofessional (e.g. with the GEOCITIES logo which only worked for free non-professional websites) or needs special consideration to make it work with a page design (YELP left a big empty bar on the right to allow space for the map to scroll). More recently GETSATISFACTION has introduced a small feedback button that always appears in a fixed position on the side of the screen which due to its small size is accepted and used by many website owners. Unfortunately this approach does not scale to larger user interface elements and also suffers from the duplicate user interface element problem described above.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium that is configured for a web page to conventionally load in a browser when requested. With the web page, a visual element is loaded, but initially hidden from view. The visual element in one embodiment is a branding or search tool bar. For ease of discussion reference will be made to examples with a search toolbar.

When a scroll action is detected within the browser, a script determines the location of web page relative to the scroll action. After scrolling a predetermined distance on the screen the hidden search tool bar is rendered for viewing. In one example embodiment, the distance is based a computer screen (or display) horizontal direction (horizontal scroll) or vertical direction (vertical scroll). For ease of discussion, the examples herein will be described in the context of a vertical scroll. Accordingly, in one example embodiment, when the horizontal scroll is detected to be below a fold of a web page, the hidden search toolbar is rendered. As the scroll action continues, the visual search toolbar continues to display at a predetermined location on the screen over the web page, e.g., top of the screen.

When the scroll goes in the opposite direction, e.g., towards the top of the originally loaded web page, and reaches above the fold the visual bar will be hidden. The hidden toolbar allows the entire browser window to be available for the web page content and not conflict other user interface elements within the web page.

Computing Machine Architecture

Figure 1:
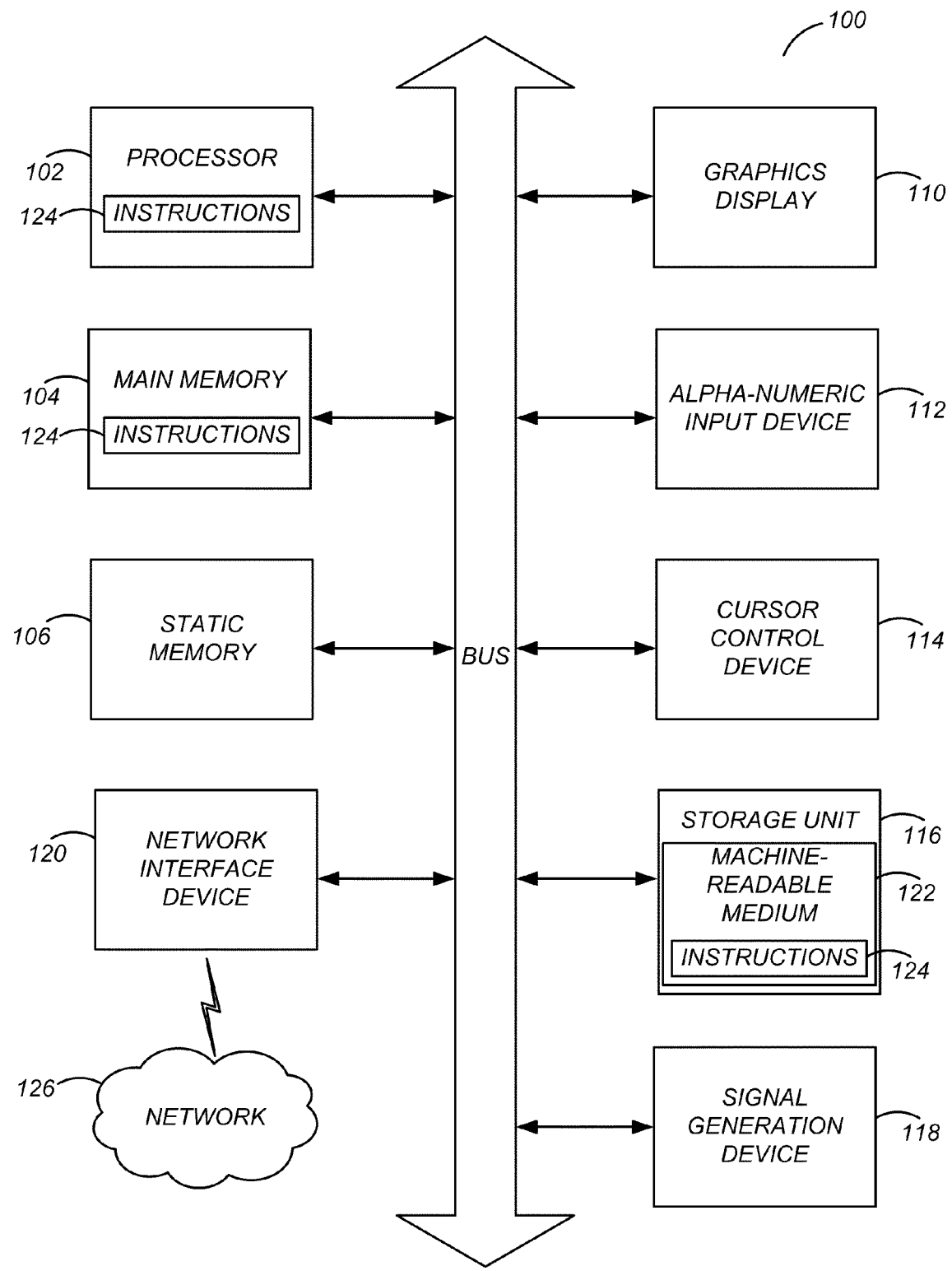
FIG. 1 illustrates one embodiment of components of an example machine able to read instructions from a machine-readable medium and execute them in a processor (or controller).

FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 820, which also are configured to communicate via the bus 108.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120. It is noted that the instructions 124 when stored or executed by be referenced as functional modules.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Example Configuration

In one embodiment, a sample implementation uses computer program code (or instructions 124), for example, JavaScript and hypertext markup language (HTML) code, and can run in any standards compliant web browser, for example, INTERNET EXPLORER, FIREFOX, SAFARI, OPERA, CHROME, etc. Any web page interoperable with the disclosed technology configuration includes instructions 124, e.g., in one embodiment HTML and JavaScript code as described herein. These instructions 124 (e.g., HTML and JavaScript code) are executed when the embodied web page is loaded in the web browser. As previously noted, the instructions 124 of the code may also be referenced as functional modules that operate as further described herein.

For ease of discussion the instructions 124 for the computer program code described herein will be described in the context of a script, which is stored in the storage unit 116 and/or main memory 104 and executed by the processor 102. The script is configured to correspond with a visual element bar ("bar") and scroll function as described herein.

Figure 2:
FIG. 2 illustrates one embodiment of a web page with a search toolbar loaded but hidden.

Referring now to FIG. 2, it illustrates one embodiment of a web page 210 with a search toolbar loaded, but hidden (not shown). The web page 210 includes a conventional search toolbar 220. If the web page is scrolled, at some point below the fold the conventional search toolbar 220 would no longer be viewable, i.e., it would disappear from view.

Figure 3:
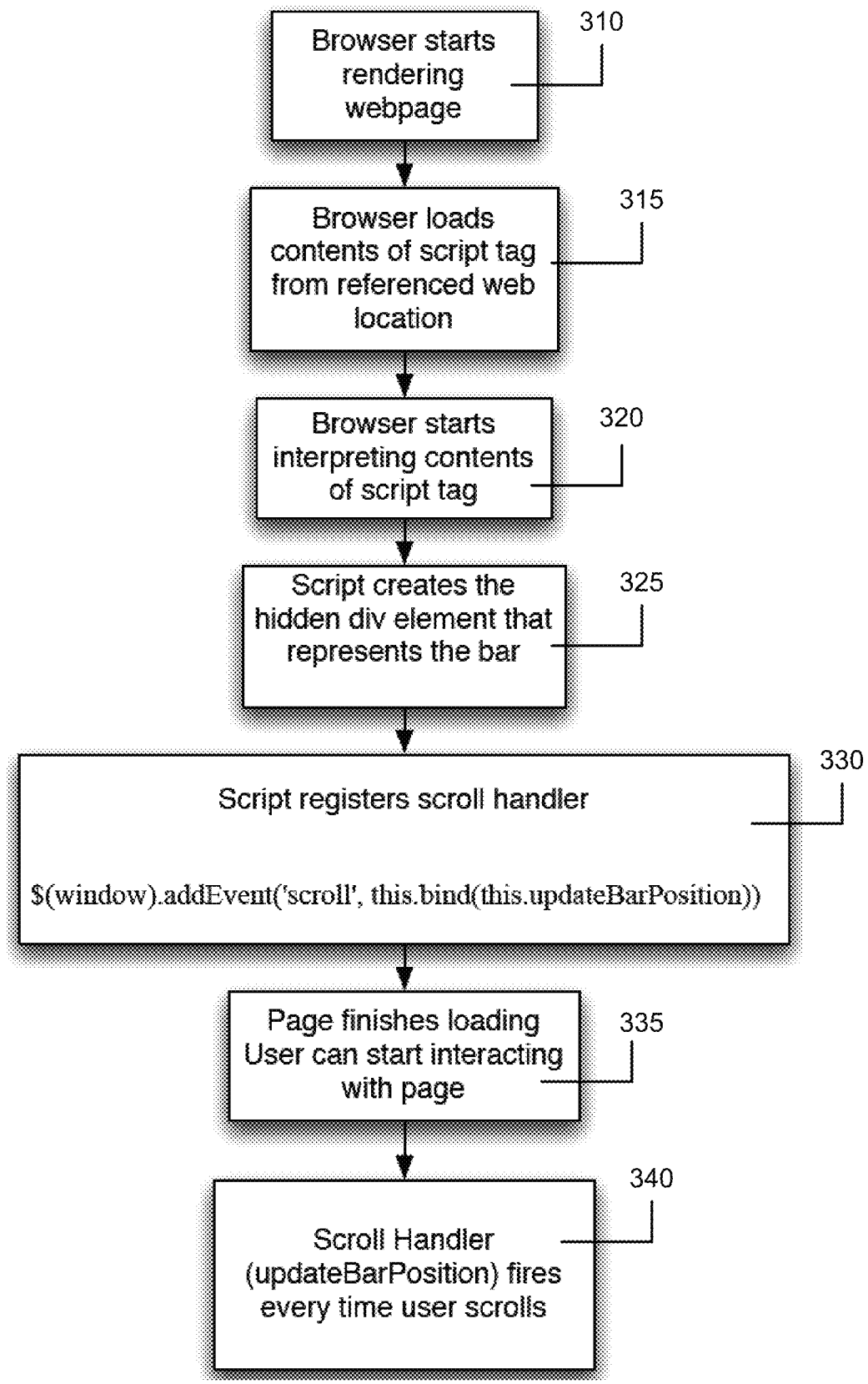
FIG. 3 illustrates one embodiment of a process for loading a search toolbar with a web page.

Next, FIG. 3 illustrates one embodiment of a process for loading a search toolbar 310 with the web page 210. Initially, a browser receives a web address, e.g., a universal resource locator (URL), from which to load and render a web page. The process starts with the browser starting to render 310 the web page. The browser loads 315 contents of a script from a referenced web location, e.g., a remote server. Alternately, a web page may incorporate the full script. The process continues with the browser starting to interpret 320 the contents of the script. When interpreted by the browser the script creates 325 a hidden div element that represents (or corresponds to) the search toolbar. The script registers 330 with a scroll handler of the operating system. The web page finishes 335 loading. Once loaded, a user can interact with the page through the web browser.

Figure 4A:
FIG. 4a illustrates one embodiment a search toolbar appearing within web page.

When a scroll is detected within the web browser, the scroll handler fires 340, thus detecting the scroll activity. Specifically, the scroll handler is called when the web page is scrolled with the web browser. If the scroll handler detects activity above (or at) the threshold and the search toolbar is hidden, the scroll handler takes no action. However, if the scroll handler detects activity below (or at) the threshold and the bar is hidden, it calls a function to display the search toolbar. It is noted that in this context lower on the page means a higher scroll offset. Hence, below the threshold (higher scroll offset) an action of the disclosed configuration is to show the toolbar if it is currently hidden and above the threshold (lower scroll offset) hide the toolbar if it is already showing FIG. 4a illustrates one example embodiment a search toolbar 320 appearing within the web page 210. Specifically, in this example, scroll activity detected by the scroll handler has met the threshold requirements. This causes the scroll handler to trigger the script portion corresponding to rendering the search toolbar 320 for display on the screen. In one embodiment the search toolbar 320 is shown as a DIV overlay within the web page.

Figure 4B:
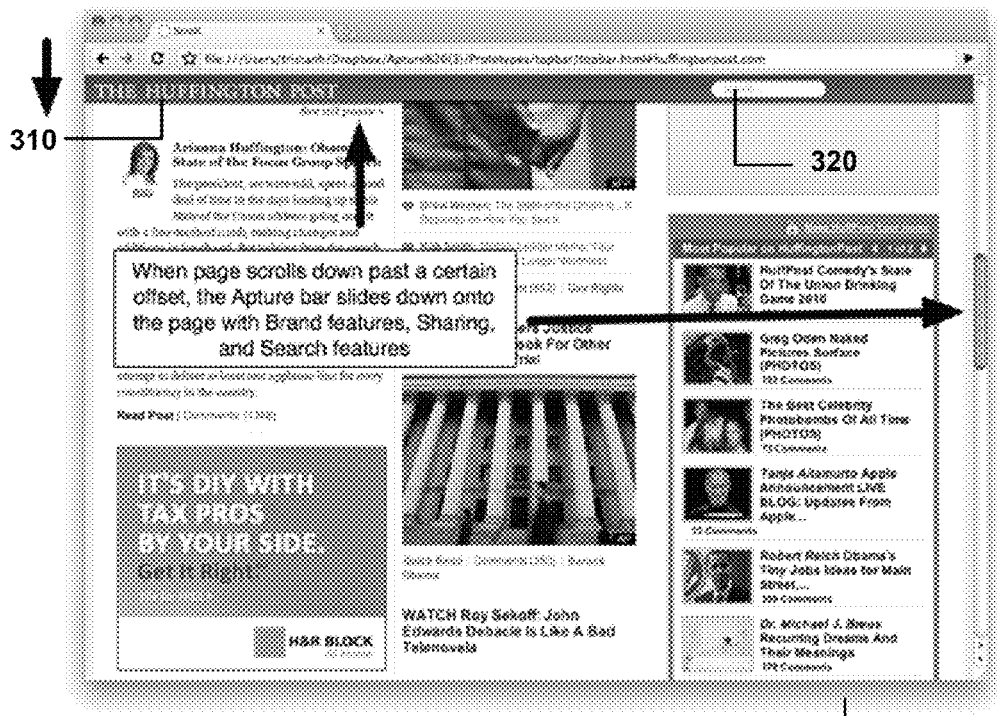
FIG. 4b illustrates one embodiment of a search toolbar remaining with a web page below a fold of the web page.

FIG. 4b illustrates one example embodiment of the search toolbar 320 remaining visible in the context of the web page 210 after triggering. The search toolbar 320 in this example corresponds to that part of the web page 210 as appearing at some predefined location within the context of the web page (e.g., top part of the web page) 210. The search toolbar 320 in one embodiment remains at that predetermined location the viewing area within the browser as the web page 210 is scrolled within the browser. The search toolbar 320 remains in the viewing area at the predetermined location until the web page 210 is scrolled back up past the predetermined threshold, e.g., toward the top of the originally rendered web page 210.

Figure 5:
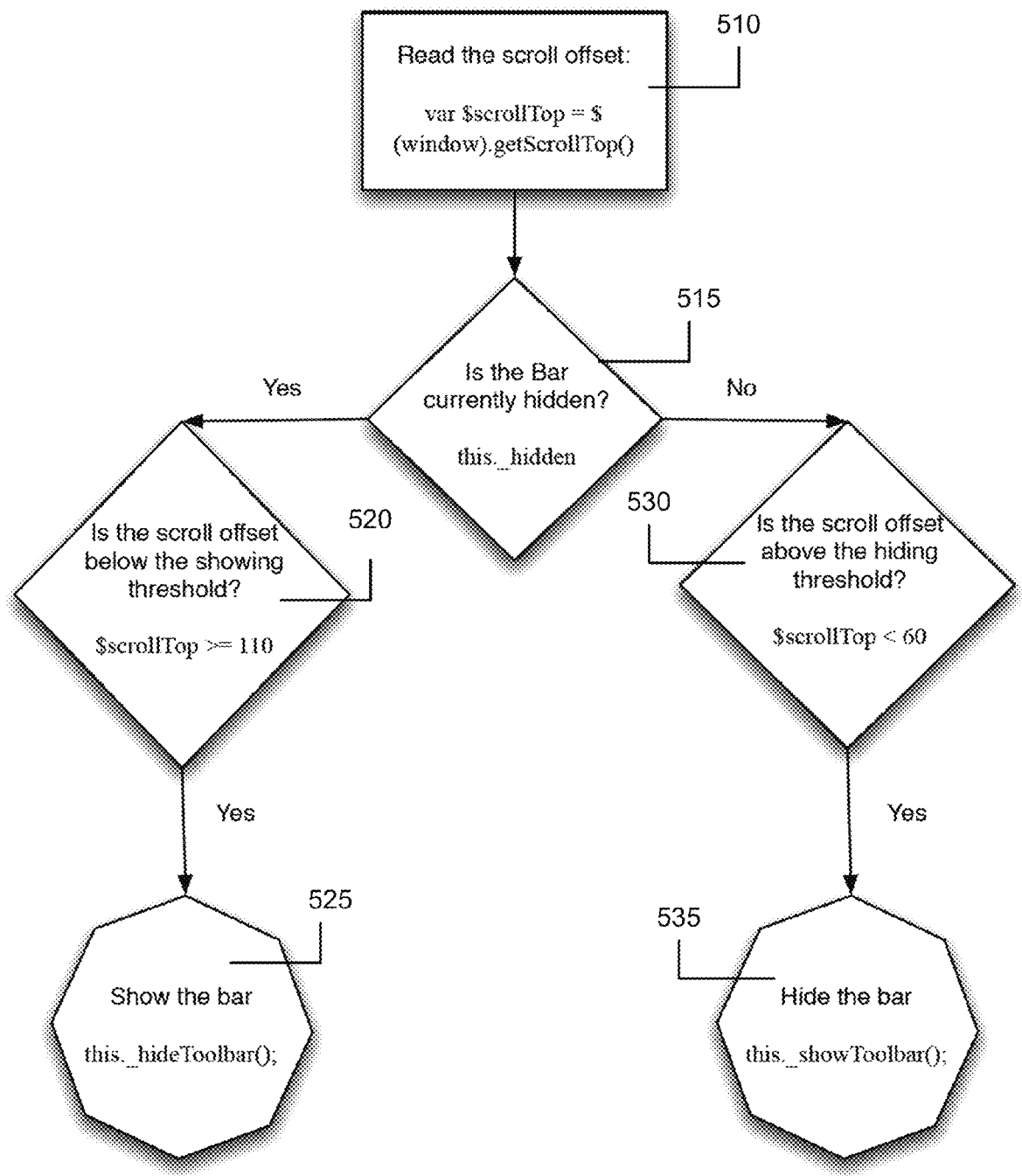
FIG. 5 illustrates one embodiment of a process for rendering or hiding a toolbar loaded within a web page.

Referring to FIG. 5, it illustrates one embodiment of a process for rendering or hiding the search toolbar 320 loaded with the web page 210. The process starts with the scroll handler reading 510 a scroll offset. The process then determines 515 whether the search toolbar 320 is currently hidden, i.e., not visually displayed. If the search toolbar 320 is hidden, the process determines 320 if the scroll offset is below a predefined threshold. If not, no action is taken (not shown) with respect to the page. If the scroll offset is above (or at) a predetermined threshold the scroll handler shows 525 the search toolbar 320 by calling a function within the script to show the DIV overlay at a predefined location within the web browser, e.g., the top of the web browser web page viewing area. It is noted that in one embodiment the threshold value for showing the search toolbar 320 may be determined by moving the web page downward a predetermined number of horizontal lines, e.g., below a fold of a web page or a number of lines corresponding to a top of the web page to where the search bar 220 in the web page is located.

If it is determined 515 that the search toolbar is not hidden, the process determines 530 if the scroll offset is above (or at) a predetermined hiding threshold, e.g., moving the web page upward a predetermined number of horizontal lines such as a fold of a web page or a number of lines corresponding to a top of the web page to where the search bar 220 in the web page is located. If not, no action is taken (not shown). If the scroll offset is above (or at) the hiding threshold, the scroll hander hides 535 the toolbar by calling a function within the script to hide the DIV overlay.

As noted previously, the bar itself in one embodiment comprises as an HTML DIV element that contains other user interface elements. For example, the user interface elements may include branded ads. Further, it is noted that in one embodiment the bar is pre-identified and tagged as noted for interoperation with the script as described herein. In alternate embodiments, a web page may be analyzed in advance to identify elements that would be of interest to function as noted herein. The identified elements are tagged and stored, e.g., in a cache, for interoperation with the script, for example, when the web browser executes as further described herein.

Interoperation with Web Page

In one embodiment, a load sequence for a script is configured as described previously. Specifically, a web browser (e.g., FIREFOX, INTERNET EXPLORER, OPERA, SAFARI, or CHROME (see also FIG. 6 herein)) retrieves a web page, e.g., web page 210, containing a tag (corresponding to the visual element bar, e.g., the search toolbar) for the script (a script tag). The web browser starts to render the web page. The web browser identifies the script tag and loads the script that it references. The web browser continues with interpreting the script. The script creates a hidden (or invisible) div for the bar, which is further described below. The script registers a scroll handler (e.g., $(window).addEvent ('scroll', this.bind(this.updateBarPosition)) and the web page is ready for viewing.

Once the load sequence has completed the updateBarPosition function is called every time a user scrolls the page. The updateBarPosition function itself obtains the updated scroll position and displays the bar within the web browser if the user has scrolled beyond a certain threshold (e.g., vertical line or horizontal line of a screen displaying the web browser) and hides it otherwise. In one embodiment, a functional code is configured as follows:

```
updateBarPosition: function( ) {
var $scrollTop = $(window).getScrollTop( );
if ($scrollTop < 60 && !this._hidden) {
this._hideToolbar( );
} else if ($scrollTop >= 110 && this._hidden) {
this.showToolbar( );
}
}
```

With respect to constructing the visual element bar, the bar is implemented as a div. The <div> tag defines a division or a section in, for example, a HTML document; the <div> tag can be used to group block-elements to format them with styles) containing other HTML elements and is styled via cascaded style sheets (CSS) and images. In one embodiment, the bar is positioned using the position fixed attribute of a web browser. By way of example, in an INTERNET EXPLORER browser the bar can be positioned by adding code to the scroll handler (updateBarPosition) to reposition the bar every time the user scrolls within the web page.

Additional Configuration Considerations

The disclosed configuration beneficially allows for display visual elements through a visual element bar within a web page. It is noted that within the specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Figure 6:
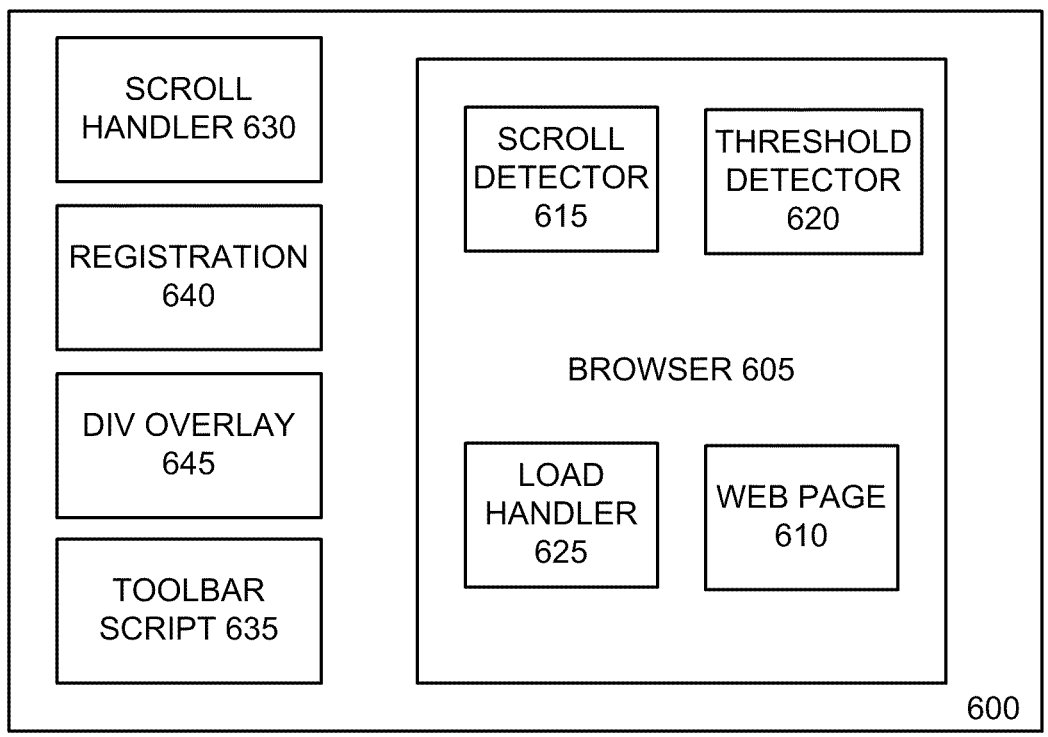
FIG. 6 illustrates one embodiment of a visual element rendering system.

As noted above, certain embodiments are described herein as including logic or a number of components, modules, or mechanisms. For example, the functionality of the process in FIGS. 3 and 5 can be provided through modules. By way of example, FIG. 6 illustrates one embodiment of a visual element rendering system 600. The system 600 in this example is in the context of a search toolbar rendering system. The system 600 includes modules corresponding to a browser 605, a scroll hander 630, a toolbar script 635, a registration 640, and an DIV overlay 645. The browser 605 includes a web page 610, a scroll detector 615, a threshold detector 620, and a load handler 625.

The web page 610 is functionally similar to web page 610 and is what the browser 605 retrieved for display within it. The load handler 625 retrieves and loads a toolbar script 635 when the web page 610 is retrieved for rendering. Once the web page 610 is loaded, the script through the registration module 640 registers the scroll hander 630. The scroll detector 615 detects scrolling action within the browser 605 relative to the web page 610 as previously described, e.g., in FIG. 3. The threshold detector 620 detects whether a predetermined threshold is reached or not to notify the scroll handler 630 to render or not render the search toolbar, e.g., as described in FIGS. 3 and 5. The rendered toolbar may be a DIV overlay with the web page. It is noted that this is just one example configuration for a system and that other variations corresponding to the functionality described herein can exist.

Modules may constitute either software modules (e.g., code embodied as instructions, e.g., 124, on a machine-readable storage medium, e.g., 104, 116 and executable by one or more processors (or controllers), e.g., 102)) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 102 that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors 102 or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors 102, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory), e.g., as instructions 124. These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process configuring independent visual elements, e.g., a search toolbar, within a web page through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for integrating a visual element bar with a web page in a web browser, the method comprising:
    retrieving, through a computing device, a web page within a web browser, the web page including a script tag corresponding to a script;
    rendering the web page in the web browser;
    identifying the script tag within the web page and loading the script for a visual element bar;
    creating, through the script, a hidden div tag for the visual element bar;
    registering, through the script, a scroll handler; detecting, through the scroll handler, a scroll offset of the web page;
    rendering the visual element bar with the web page in the web browser based upon a determination that the scroll offset exceeds a threshold; and
    hiding the visual element bar when the scroll offset does not exceed the threshold,
    wherein the rendering the visual element bar comprises:
        rendering the visual element bar as an overlay at a predefined location within a web page viewing area of the web browser.

2. The method of claim 1, wherein creating a div tag further comprises:
    reading a div tag containing other hypertext markup language (HTML) elements, wherein the div tag is styled via cascading style sheets (CSS) and images; and
    positioning the visual element bar using the scroll offset in the web browser.

3. The method of claim 1, wherein the rendering the visual element bar as an overlay comprises:
    rendering the visual element bar on top a portion of the web page.

4. The method of claim 1, wherein the visual element bar comprises a search bar associated with the web page.

5. A non-transitory computer readable storage medium storing instructions that, when executed, cause at least one processor to:
    retrieve a web page within a web browser, the web page including a script tag corresponding to a script;
    render the web page in the web browser;
    identify the script tag within the web page and loading the script for a visual element bar;
    create, through the script, a hidden div tag for the visual element bar;
    register, through the script, a scroll handler;
    detect, through the scroll handler, a scroll offset of the web page;
    render the visual element bar with the web page in the web browser based upon a determination that the scroll offset exceeds a threshold; and
    hide the visual element bar when the scroll offset does not exceed the threshold,
    wherein the instructions to render the visual element bar comprise:
        instructions that cause the at least one processor to render the visual element bar as an overlay at a predefined location within a web page viewing area of the web browser.

6. The computer readable storage medium of claim 5, wherein the instructions to create a div tag further comprises instructions that cause the at least one processor to:
   read a div tag containing other hypertext markup language (HTML) elements, wherein the div tag is styled via cascading style sheets (CSS) and images; and
   position the visual element bar using the scroll offset in the web browser.

7. The computer-readable storage medium of claim 5, wherein the instructions to render the visual element bar as an overlay comprise:
   instructions that cause the at least one processor to render the visual element bar on top a portion of the web page.

8. The computer-readable storage medium of claim 5, wherein the visual element bar comprises a search bar associated with the web page.

9. A system for integrating a visual element bar with a web page in a web browser, the system comprising:
   at least one processor; and
   memory, communicatively coupled to the at least one processor, storing instructions that, when executed by the at least one processor, configure the at least one processor to:
   retrieve a web page within a web browser, the web page including a script tag corresponding to a script;
   render the web page in the web browser;
   identify the script tag within the web page and loading the script for a visual element bar;
   create, through the script, a hidden div tag for the visual element bar;
   register, through the script, a scroll handler;
   detect, through the scroll handler, a scroll offset of the web page;
   render the visual element bar with the web page in the web browser based upon a determination that the scroll offset exceeds a threshold; and
   hide the visual element bar when the scroll offset does not exceed the threshold,
   wherein the instructions to render the visual element bar comprise:
   instructions that cause the at least one processor to render the visual element bar as an overlay at a predefined location within a web page viewing area of the web browser.

10. The system of claim 9, where in the script when creating a div tag further comprises:
    reading a div tag containing other hypertext markup language (HTML) elements, wherein the div tag is styled via cascading style sheets (CSS) and images; and
    positioning the visual element bar using the scroll offset in the web browser.

11. The method of claim 9, wherein the browser is configured to:
    render the visual element bar on top a portion of the web page.

12. The system of claim 9, wherein the visual element bar comprises a search bar associated with the web page.

* * * * *